US012191958B2

(12) United States Patent
Liu et al.

(10) Patent No.: US 12,191,958 B2
(45) Date of Patent: Jan. 7, 2025

(54) METHODS AND APPARATUSES FOR PHASE TRACKING REFERENCE SIGNAL

(71) Applicant: Lenovo (Beijing) Ltd., Beijing (CN)

(72) Inventors: Bingchao Liu, Changping District (CN); Chenxi Zhu, Haidian District (CN); Wei Ling, Changping (CN); Lingling Xiao, Haidian District (CN)

(73) Assignee: Lenovo (Beijing) Ltd., Beijing (CN)

( * ) Notice: Subject to any disclaimer, the term of this patent is extended or adjusted under 35 U.S.C. 154(b) by 374 days.

(21) Appl. No.: 17/641,334

(22) PCT Filed: Sep. 26, 2019

(86) PCT No.: PCT/CN2019/108118
§ 371 (c)(1),
(2) Date: Mar. 8, 2022

(87) PCT Pub. No.: WO2021/056326
PCT Pub. Date: Apr. 1, 2021

(65) Prior Publication Data
US 2022/0302981 A1   Sep. 22, 2022

(51) Int. Cl.
*H04B 7/06* (2006.01)
*H04L 5/00* (2006.01)
*H04W 72/23* (2023.01)

(52) U.S. Cl.
CPC ......... *H04B 7/0639* (2013.01); *H04B 7/0632* (2013.01); *H04L 5/0051* (2013.01); *H04W 72/23* (2023.01)

(58) Field of Classification Search
CPC .. H04B 7/0639; H04B 7/0632; H04B 7/0478; H04L 5/0051; H04W 72/23
See application file for complete search history.

(56) References Cited

U.S. PATENT DOCUMENTS

| 2019/0140729 | A1* | 5/2019  | Zhang | H04W 52/16 |
| 2019/0296876 | A1* | 9/2019  | Zhang | H04L 5/0048 |
| 2019/0341950 | A1* | 11/2019 | Lee   | H04L 5/0048 |
| 2020/0395988 | A1* | 12/2020 | Lee   | H04L 5/0087 |
| 2022/0077982 | A1* | 3/2022  | Zhang | H04L 5/0014 |

FOREIGN PATENT DOCUMENTS

| EP | 3955502 A1    | 2/2022 |
| WO | 2021028045 A1 | 2/2021 |

OTHER PUBLICATIONS

"International Preliminary Report on Patentability", PCT Application No. PCT/CN2019/108118, Apr. 7, 2022, 6 pages.
"International Search Report and Written Opinion", PCT Application No. PCT/CN2019/108118, Jun. 17, 2020, 7 pages.

(Continued)

*Primary Examiner* — Shailendra Kumar
(74) *Attorney, Agent, or Firm* — FIG. 1 Patents

(57) ABSTRACT

Methods and apparatuses for phase tracking reference signal are disclosed. A method comprises configuring a PT-RS with N PT-RS antenna ports when a 'Transmission Configuration Indication (TCI)' field in DCI indicates N TCI states, wherein N is 2 or more; associating each PT-RS antenna port with one DM-RS antenna port; and transmitting the PT-RS with the N PT-RS antenna ports.

20 Claims, 3 Drawing Sheets

(56) References Cited

OTHER PUBLICATIONS

Huawei, et al., "Summary of AI: 7.2.8.2 Enhancements on Multi-TRP/Panel Transmission of Offline Discussion", 3GPP TSG RAN WG1 Meeting #95, R1-1814003, Spokane, WA, USA, Nov. 2018, 32 pages.
Intel Corporation, "Discussion on multi-TRP/multi-panel transmission", 3GPP TSG RAN WG1 Meeting #95, R1-1812509, Spokane, WA, USA, Nov. 2018, 13 pages.
Lenovo, et al., "Discussion of multi-TRP/panel transmission", 3GPP TSG RAN WG1 #96bis, R1-1904572, Xi'an, China, Apr. 2019, 11 pages.
19947017.0, "Extended European Search Report", EP Application No. EP 19947017.0, May 11, 2023, 10 pages.
OPPO, "Enhancements on multi-TRP and multi-panel transmission", 3GPP TSG RAN WG1 Meeting #96, R1-1902701, Athens, Greece [retrieved Jun. 5, 2023]. Retrieved from the Internet <https://www.3gpp.org/ftp/tsg_ran/WG1_RL1/TSGR1_96/Docs>., Feb. 2019, 8 Pages.
ZTE, "Enhancements on multi-TRP/Panel transmission", 3GPP TSG RAN WG1 #96, R1-1901634, Athens, Greece retrieved [Jun. 5, 2023]. Retrieved from the Internet <https://www.3gpp.org/ftp/TSG_RAN/WG1_RL1/TSGR1_96/Docs/>., Feb. 2019, 19 Pages.

\* cited by examiner

METHODS AND APPARATUSES FOR PHASE TRACKING REFERENCE SIGNAL

FIELD

The subject matter disclosed herein generally relates to wireless communications, and more particularly relates to methods and apparatuses for phase tracking reference signal.

BACKGROUND

The following abbreviations are herewith defined, at least some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Orthogonal Frequency Division Multiplexing (OFDM), Radio Resource Control (RRC), Time-Division Duplex (TDD), Time Division Multiplex (TDM), User Entity/Equipment (Mobile Terminal) (UE), Uplink (UL), Universal Mobile Telecommunications System (UMTS), Physical Downlink Shared Channel (PDSCH), Physical Uplink Shared Channel (PUSCH), Downlink control information (DCI), single DCI (S-DCI), transmission reception point (TRP), multiple TRP (M-TRP), phase tracking reference signal (PT-RS), frequency range 2 (FR2), Demodulation reference signal (DM-RS), Quasi Co-Location (QCL), Channel Quality Indicator (CQI), precoding matrix indicator (PMI), layer indicator (LI), rank indicator (RI), channel state information reference signal (CSI-RS), CSI-RS Resource Indicator (CRI), Code Division Multiplexing (CDM), Transmission Configuration Indication (TCI).

Phase tracking reference signal (PT-RS) is used for phase noise estimation. Phase noise is related to crystal oscillator. All antenna ports of one TRP usually share a same crystal oscillator. Therefore, the phase noises of different antenna ports from one TRP are correlated and can be estimated by a single PT-RS antenna port. PT-RS with single antenna port is defined in NR Release 15 for single TRP DL transmission in FR2 (24.25 GHz-52.6 GHz).

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, and average delay. Each PT-RS antenna port and the associated DM-RS antenna port are assumed to be quasi co-located with respect to {'QCL-TypeA' and 'QCL-TypeD'}. If two antenna ports are quasi co-located with QCL-TypeA, the UE may assume that the two antenna ports are quasi co-located with respect to Doppler shift, Doppler spread, average delay and delay spread. If two antenna ports are quasi co-located with QCL-TypeD, the UE may assume that the two antenna ports are quasi co-located with respect to Spatial Rx parameter. If a UE is scheduled with one codeword, the PT-RS antenna port is associated with the lowest indexed DM-RS antenna port among the DM-RS antenna ports assigned for the PDSCH. The lowest indexed DM-RS antenna port can be equivalent to the strongest spatial layer, that may be indicated by layer indicator (LI) reported by UE.

Traditionally, a UE is required to report CSI, which may include Channel Quality Indicator (CQI), precoding matrix indicator (PMI), layer indicator (LI), rank indicator (RI), and/or CSI-RS Resource Indicator (CRI), among other parameters. In particular, the LI indicates which column of the precoder matrix of the reported PMI corresponds to the strongest layer of the codeword corresponding to the largest reported CQI. If two CQIs are reported and have equal value, the LI corresponds to strongest layer of the first codeword.

In a single DCI (S-DCI) based multiple TRP (M-TRP) DL transmission scenario, one DCI can schedule a PDSCH transmitted by antenna ports from different TRPs. Different TRPs may transmit different spatial layers of the scheduled PDSCH. As a matter of fact, multiple TRPs cannot share the same crystal oscillator. Therefore, PT-RS with a single antenna port is not possible to be used for phase noise estimation for antenna ports from multiple TRPs.

The present application is proposed to solve the problem of estimating phase noises of multiple TRPs.

BRIEF SUMMARY

Methods and apparatuses for phase tracking reference signal are disclosed.

In one embodiment, a method comprises configuring a PT-RS with N PT-RS antenna ports when a 'Transmission Configuration Indication (TCI)' field in DCI indicates N TCI states, wherein N is 2 or more; associating each PT-RS antenna port with one DM-RS antenna port; and transmitting the PT-RS with the N PT-RS antenna ports.

In one embodiment, the method further comprises configuring a UE to report N layer indicators (LIs); and receiving the reported N LIs, wherein each of the N LIs indicates a strongest layer among layers reported by one of N PMIs. In particular, each of the strongest layers is assigned to one of the DM-RS antenna ports associated with the PT-RS antenna ports.

In another embodiment, each PT-RS antenna port may be associated with the lowest indexed DM-RS antenna port among the indicated DM-RS antenna ports associated with a different TCI state indicated by the TCI field in the DCI. In particular, N may be equal to 2, a first PT-RS antenna port is associated with the lowest indexed DM-RS antenna port among the indicated DM-RS antenna ports associated with a first TCI state indicated by the TCI field in the DCI, and a second PT-RS antenna port is associated with the lowest indexed DM-RS antenna port among the indicated DM-RS antenna ports associated with a second TCI state indicated by the TCI field in the DCI. In some embodiment, N may be equal to 2, DM-RS type 1 or DM-RS type 2 may be configured and two CDM groups are indicated by 'antenna port(s)' field in the DCI. In this condition, a first PT-RS antenna port is associated with the lowest indexed DM-RS antenna port among the indicated DM-RS antenna ports within a first indicated CDM group, and a second PT-RS antenna port is associated with the lowest indexed DM-RS antenna port among the indicated DM-RS antenna ports within a second indicated CDM group. In some embodiment, N may be equal to 2, DM-RS type 2 may be configured and three CDM groups are indicated by 'antenna port(s)' field in the DCI. In this condition, a first PT-RS antenna port is associated with the lowest indexed DM-RS antenna port among the indicated DM-RS antenna ports within a first indicated CDM group, and a second PT-RS antenna port is associated with the lowest indexed DM-RS antenna port among the indicated DM-RS antenna ports within the other two indicated CDM groups. In some embodiment, N may be equal to 3, DM-RS type 2 may be configured and three CDM groups are indicated by 'antenna port(s)' field in the DCI. In this condition, a first PT-RS antenna port is associated with the lowest indexed DM-RS antenna port among the indicated DM-RS antenna ports within a first indicated CDM group, a second PT-RS antenna port is associated with the lowest indexed DM-RS antenna port among the indicated DM-RS antenna ports within a second indicated CDM group, and a third PT-RS antenna port is associated with the lowest indexed DM-RS antenna port among the indicated DM-RS antenna ports within a third indicated CDM group. In some embodiment, N may be equal to 2, and two codewords are scheduled by the DCI. In this condition, a first PT-RS antenna port is associated with the lowest indexed DM-RS antenna port among the indicated DM-RS antenna ports assigned for a first codeword, and a second PT-RS antenna port is associated with the lowest indexed DM-RS antenna port among the indicated DM-RS antenna ports assigned for a second codeword.

In some embodiment, two PMIs and single CQI and two LIs may be reported. Therefore, a first LI indicates which column of the precoder matrix of a first reported PMI corresponds to the strongest layer, and a second LI indicates which column of the precoder matrix of a second reported PMI corresponds to the strongest layer. In some embodiment, two PMIs and two CQIs and two LIs may be reported. Accordingly, a first LI indicates which column of the precoder matrix of the reported PMI corresponds to the strongest layer corresponding to the larger reported CQI, and a second LI indicates which column of the precoder matrix of the reported PMI corresponds to the strongest layer corresponding to the other reported CQI.

In some embodiment, two PMIs and two CQIs and two LIs may be reported. Accordingly, a first LI indicates which column of the precoder matrix of the first reported PMI corresponds to the strongest layer, and a second LI indicates which column of the precoder matrix of the second reported PMI corresponds to the strongest layer. In particular, two reported CQIs may have equal value.

In one embodiment, a base unit comprises a processor that configures a PT-RS with N PT-RS antenna ports when a 'Transmission Configuration Indication (TCI)' field in DCI indicates N TCI states, and associates each PT-RS antenna port with one DM-RS antenna port, wherein N is 2 or more; and a transmitter that transmits the PT-RS with the N PT-RS antenna ports.

In another embodiment, a method comprises receiving a PT-RS with N PT-RS antenna ports, wherein N is 2 or more, wherein the N PT-RS antenna ports is configured when a 'Transmission Configuration Indication (TCI)' field in DCI indicates N TCI states, and each PT-RS antenna port is associated with a DM-RS antenna port.

In yet another embodiment, a remote unit comprises a receiver that receives a PT-RS with N PT-RS antenna ports, wherein N is 2 or more, wherein the N PT-RS antenna ports is configured when a 'Transmission Configuration Indication (TCI)' field in DCI indicates N TCI states, and each PT-RS antenna port is associated with a DM-RS antenna port.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
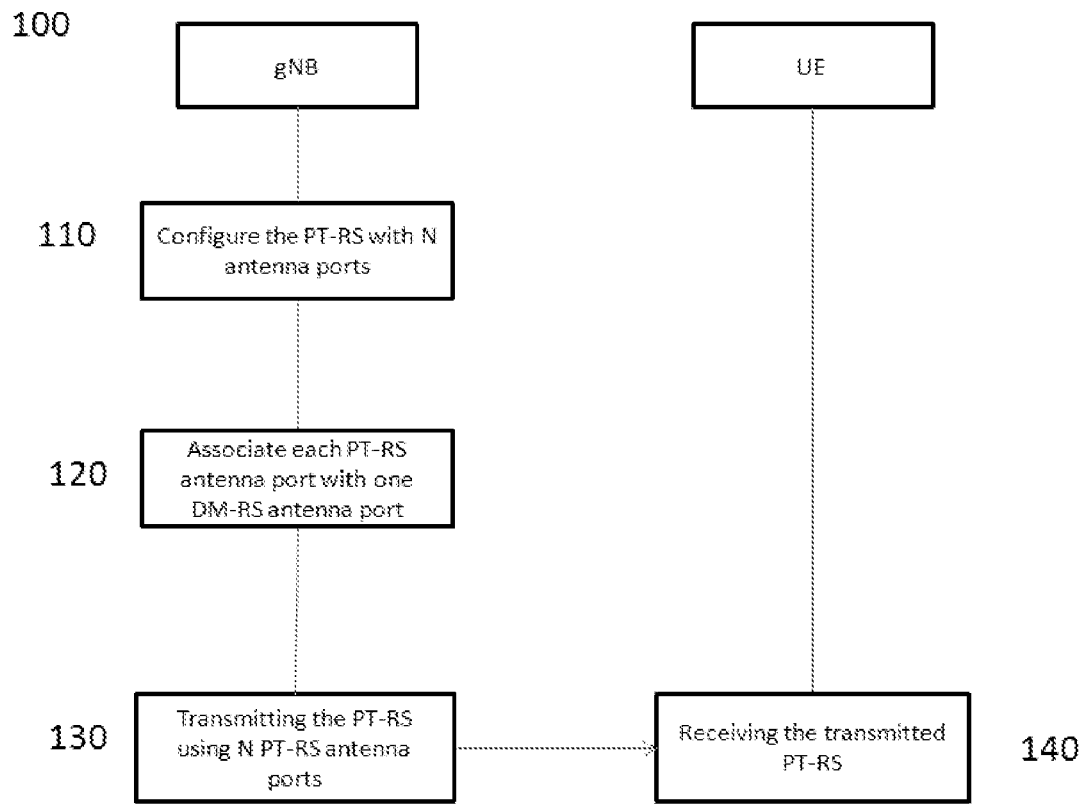
FIG. 1 is a schematic flow chart diagram illustrating a method of the present application.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

When a DCI schedules PDSCH transmission from multiple TRPs for a UE, the 'Transmission Configuration Indication (TCI)' field in the DCI includes N TCI states, wherein N is 2 or more. In this condition, PT-RS for the UE may be configured with the same number of N antenna ports (may be referred to as "PT-RS antenna ports" hereinafter). The PT-RS transmitted using each of the N antenna ports can be used for phase noise estimation associated with each of the N TRPs.

FIG. 1 is a schematic flow chart diagram illustrating a method of transmitting and receiving phase tracking reference signal (PT-RS).

At step 110, the gNB configures the PT-RS with N antenna ports (N PT-RS antenna ports), wherein N is 2 or more. N is equal to the number of TCI states indicated by the 'Transmission Configuration Indication (TCI)' field in the DCI for scheduling PDSCH transmission.

At step 120, each PT-RS antenna port may be associated with one DL DM-RS antenna port and apply the same precoder for phase noise estimation. There are several ways of associating each PT-RS antenna port with one out of multiple DM-RS antenna ports.

According to a first embodiment, when each TCI state indicated by the 'TO' field in the DCI is associated with a DM-RS group including one or more DM-RS antenna ports, each PT-RS antenna port may be associated with the lowest indexed DM-RS antenna port among the indicated DM-RS antenna ports of the DM-RS group associated with the TCI state.

For S-DCI based M-TRP DL transmission with two TRPs for one UE, the PT-RS for the UE may be configured with two antenna ports (two PT-RS antenna ports). The TCI field in the DCI indicates two TCI states that are associated with two DM-RS groups, and each DM-RS group includes one or more DM-RS antenna ports. The first PT-RS antenna port, i.e. PT-RS antenna port 0, is associated with the lowest indexed DM-RS antenna port within the first DM-RS group associated with the first indicated TCI state (which may be associated with the one TRP). In addition, the second PT-RS antenna port, i.e. PT-RS antenna port 1, is associated with the lowest indexed DM-RS antenna port within the second DM-RS group associated with the second indicated TCI state (which may be associated with the other TRP).

For example, if DM-RS type 1 is configured and DM-RS antenna ports {0, 1, 2, 3} are indicated by the 'antenna port(s)' field in the DCI, where the first DM-RS group including DM-RS antenna ports {0, 1} is associated with the first TCI state (which may be associated with one TRP), and the second DM-RS group including DM-RS antenna ports {2, 3} is associated with the second TCI state (which may be associated with the other TRP), the PT-RS antenna port 0 is associated with DM-RS antenna port 0 (i.e. the lowest indexed DM-RS antenna port in the first DM-RS group) and the PT-RS antenna port 1 is associated with DM-RS antenna port 2 (i.e. the lowest indexed DM-RS antenna port in the second DM-RS group).

The above example assumes two TRPs. In the condition of N (N is three or more) TRPs, each of the N PT-RS antenna ports will be associated to the lowest indexed DM-RS antenna port of each of N DM-RS groups associated with N TCI states.

According to a second embodiment, when two CDM groups, i.e. CDM group 0 and CDM group 1, are indicated by the 'antenna port(s)' field in the DCI such as in DM-RS type 1 or DM-RS type 2, if the PT-RS is configured with two ports, i.e. PT-RS antenna port 0 and PT-RS antenna port 1, the PT-RS antenna port 0 may be associated with the lowest indexed DM-RS antenna port among the indicated DM-RS antenna ports within the first CDM group, and the PT-RS antenna port 1 is associated with the lowest indexed DM-RS antenna port among the indicated DM-RS antenna ports within the second CDM group. The first CDM group is the CDM group containing the first DM-RS port indicated by the 'antenna port(s)' field, and the other CDM group is the second CDM group.

For example, when PT-RS with two antenna ports and DM-RS type 1 are configured for one UE, and DM-RS antenna ports {4, 5, 6, 7} are indicated by the 'antenna port(s)' field in the DCI, where DM-RS antenna ports {4, 5} belong to the first CDM group, i.e. CDM group 0; and DM-RS antenna ports {6, 7} belong to the second CDM group, i.e. CDM group 1, the PT-RS antenna port 0 is associated with DM-RS antenna port 4 (i.e. the lowest indexed DM-RS antenna port among the indicated DM-RS antenna ports within the first CDM group) and PT-RS antenna port 1 is associated with DM-RS antenna port 6 (the lowest indexed DM-RS antenna port among the indicated DM-RS antenna ports within the second CDM group).

According to a third embodiment, when three CDM groups, i.e. CDM group 0, CDM group 1 and CDM group 2, are indicated by the 'antenna port(s)' field in the DCI such as in DM-RS type 2, if the PT-RS is configured with two ports, i.e. PT-RS antenna port 0 and PT-RS antenna port 1, the PT-RS antenna port 0 may be associated with the lowest indexed DM-RS antenna port among the indicated DM-RS antenna ports within the first CDM group, and the PT-RS antenna port 1 is associated with the lowest indexed DM-RS antenna port among the indicated DM-RS antenna ports within the other two CDM groups.

For example, when PT-RS with two antenna ports and DM-RS type 2 are configured for one UE, and DM-RS antenna ports {0, 1, 2, 4, 5} are indicated by the 'antenna port(s)' field in the DCI, where DM-RS antenna ports {0, 1} belong to the first CDM group, i.e. CDM group 0, DM-RS antenna port 2 belongs to the second CDM group, i.e. CDM group 1, and DM-RS antenna ports {4, 5} belong to the third CDM group, i.e. CDM group 2, the PT-RS antenna port 0 is associated with DM-RS antenna port 0 (i.e. the lowest indexed DM-RS antenna port among the indicated DM-RS antenna ports within the first CDM group) and PT-RS antenna port 1 is associated with DM-RS antenna port 2 (i.e. the lowest indexed DM-RS antenna port among the indicated DM-RS antenna ports within the second and the third CDM groups).

According to a variety of the third embodiment, when three CDM groups are indicated by the 'antenna port(s)' field in the DCI, if the PT-RS is configured with three PT-RS antenna ports, the PT-RS antenna port 0 may be associated with the lowest indexed DM-RS antenna port among the indicated DM-RS antenna ports within the first CDM group, the PT-RS antenna port 1 is associated with the lowest indexed DM-RS antenna port among the indicated DM-RS antenna ports within the second CDM groups, and the PT-RS antenna port 2 is associated with the lowest indexed DM-RS antenna port among the indicated DM-RS antenna ports within the third CDM groups.

According to a fourth embodiment, when a UE is scheduled with two codewords and PT-RS for the UE is configured with 2 antenna ports, the first PT-RS antenna port, i.e. PT-RS antenna port 0, is associated with the lowest indexed DM-RS antenna port among the indicated DM-RS antenna ports assigned for the first codeword, and the second PT-RS antenna port, i.e. PT-RS antenna port 1, is associated with the lowest indexed DM-RS antenna port among the indicated DM-RS antenna ports assigned for the second codeword.

For example, when PT-RS with two antenna ports is configured for the UE that is scheduled with two codewords (codeword 0 and codeword 1), and DM-RS antenna ports {0, 1, 2, 3, 4, 6} are indicated by the 'antenna port(s)' field in the DCI, where DM-RS antenna ports {0, 1, 4} are assigned for codeword 0 and DM-RS antenna ports {2, 3, 6} are assigned for codeword 1, the PT-RS antenna port 0 is associated with DM-RS antenna port 0 (i.e. the lowest indexed DM-RS antenna port among the indicated DM-RS antenna ports assigned for codeword 0), and the PT-RS antenna port 1 is associated with DM-RS antenna port 2 (i.e. the lowest indexed DM-RS antenna port among the indicated DM-RS antenna ports assigned for codeword 1).

After the association of each PT-RS antenna port with a corresponding DM-RS antenna port, at step 130, the gNB transmits the PT-RS using the configured N PT-RS antenna ports, each of which is associated with one DM-RS antenna port.

At step 140, the UE receives the PT-RS transmitted using the N PT-RS antenna ports.

The PT-RS received using the N PT-RS antenna ports, each of which is associated with one TCI state (which may be associated with one TRP), may be used to estimate phase noises of N TRPs.

In the above first to fourth embodiments, each PT-RS antenna port is associated with one DM-RS antenna port (the lowest indexed DM-RS antenna port among a group of indicated DM-RS antenna ports). Preferably, the gNB would transmit the N PT-RS antenna ports by using N strongest spatial layers among all DL spatial layers, in which one spatial layer corresponds to one DM-RS antenna port. Therefore, the gNB may configure the UE to report N LIs, wherein each LI indicates the strongest spatial layer of the reported PMI for a particular TCI state. As described above, each PT-RS antenna port is associated with a DM-RS antenna port that is the lowest-indexed DM-RS antenna port among a group of indicated DM-RS antenna ports. The gNB may assign each lowest-indexed DM-RS antenna port with one strongest spatial layer of the reported PMI for a particular TCI state. Therefore, each PT-RS antenna port is associated with a DM-RS antenna port with the strongest spatial layer among a group of indicated DM-RS antenna ports associated with the particular TCI state.

Figure 2:
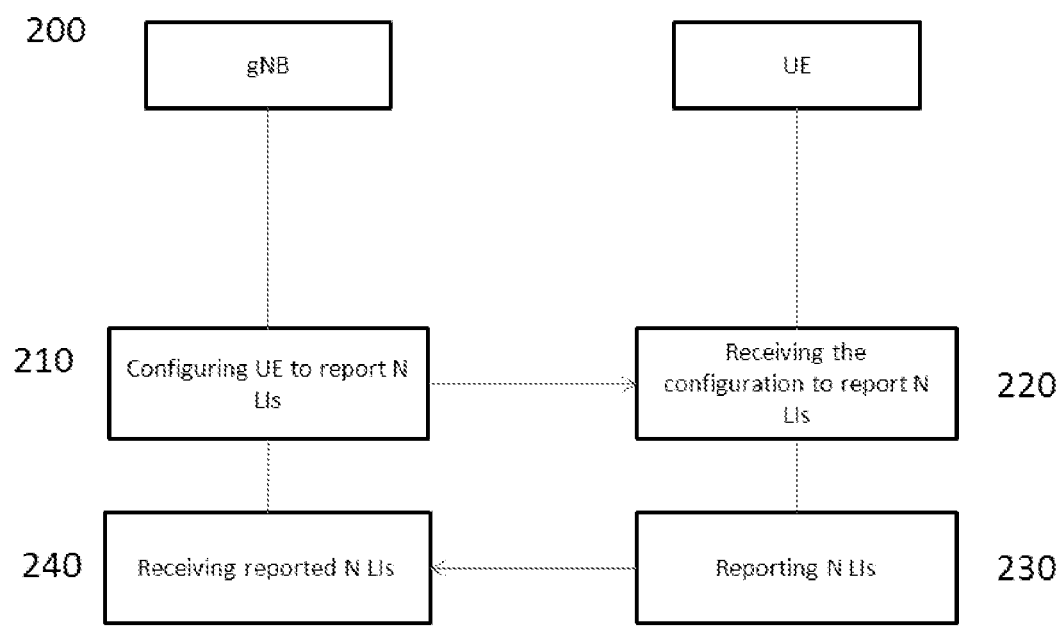
FIG. 2 is a schematic flow chart diagram illustrating a method of reporting LIs.

FIG. 2 illustrates a method 200 of reporting N LIs, wherein N is equal to the number of TCI states indicated by the TCI field of DCI.

At step 210, the gNB configures the UE to report N LIs, each of which is associated with one of N TCI states. For example, the gNB may configure and transmit multiple CSI-RS resources for channel and/or interference measurement.

At step 220, the UE receives the configuration to report N LIs for the multiple CSI-RS resources.

According to a fifth embodiment, for S-DCI based two TRPs (i.e. N=2) DL transmission scenario, CSI-RS ports of each CSI-RS resource are transmitted from the same TRP, and different CSI-RS resources can be transmitted from the same or different TRPs. In the condition of two different TRPs, the UE may report two independent PMIs and two RIs corresponding to two CSI-RS resources transmitted from two different TRPs. That is, one PMI and one RI are reported corresponding to one CSI-RS resource transmitted from one TRP. The other PMI and the other RI are reported corresponding to the other CSI-RS resource transmitted from the other TRP. If the total number of reported layers are not larger than 4, single CQI may be reported based on the reported two PMIs and two RIs. Two LIs may be required to be reported. The first LI indicates which column of the precoder matrix of the first reported PMI corresponds to the strongest layer associated with the one TRP, and the second LI indicates which column of the precoder matrix of the second reported PMI corresponds to the strongest layer associated with the other TRP.

According to a second embodiment, for S-DCI based two TRPs (i.e. N=2) DL transmission scenario, CSI-RS ports of each CSI-RS resource are transmitted from the same TRP, different CSI-RS resources may be transmitted from the same TRP or different TRPs and multiple CSI-RS resources are configured and transmitted from each TRP. The UE reports two CRIs to select two different CSI-RS resources transmitted from two TRPs. Two independent RIs and two PMIs are reported based on the two CSI-RS resources selected by the two reported CRIs. That is, one PMI and one RI are reported based on one CSI-RS resource transmitted from one TRP and selected by one CRI. The other PMI and the other RI are reported based on the other CSI-RS resource transmitted from the other TRP and selected by the other CRI. Two CQIs are reported based on the reported PMIs, RIs and CRIs. Two LIs may be required to be reported. The first LI indicates which column of the precoder matrix of the reported PMI corresponds to the strongest layer corresponding to the larger reported CQI, and the second LI indicates which column of the precoder matrix of the reported PMI corresponds to the strongest layer corresponding to the other reported CQI.

If two reported CQIs have an equal value, the first LI indicates which column of the precoder matrix of the first reported PMI corresponds to the strongest layer, and the second LI indicates which column of the precoder matrix of the second reported PMI corresponds to the strongest layer.

Alternatively, even if two reported CQIs have different values, the UE may report the first LI and the second LI without consideration of the values of the two reported CQIs. That is, even if two reported CQIs have different values, the first LI indicates which column of the precoder matrix of the first reported PMI corresponds to the strongest layer, and the second LI indicates which column of the precoder matrix of the second reported PMI corresponds to the strongest layer.

In the above-described fifth and sixth embodiments, two LIs are required to be reported, in which each LI indicates which column of the precoder matrix of a reported PMI corresponds to the strongest layer. Alternatively, three or more LIs may be required to be reported, in which each LI indicates which column of the precoder matrix of a reported PMI corresponds to the strongest layer.

At step 230, the UE reports at least the N LIs to the gNB. Optionally, the PMIs, RIs, CQIs and/or CRIs are also reported to the gNB.

At step 240, the gNB receives at least the reported N LIs. Accordingly, the gNB knows which column of the precoder matrix of each of the reported PMIs corresponds to the strongest layer. The gNB can apply each of the precoders indicated by each of the reported LIs to the corresponding DM-RS antenna ports associated with PT-RS antenna ports. In other words, the gNB may associate each PT-RS antenna port with one DM-RS antenna port with the strongest layer among a group of indicated DM-RS antenna ports associated with a particular TRP.

For example, in the condition of two PT-RS antenna ports corresponding to two TRPs (a first PT-RS antenna port corresponding to one TRP and a second PT-RS antenna port corresponding to another TRP), two LIs are reported from the UE, in which a first LI indicates the strongest layer associated with the one TRP and a second LI indicates the strongest layer associated with the other TRP. The gNB applies the strongest layer associated with the one TRP to a first DM-RS antenna port (e.g. the lowest indexed DM-RS antenna port among a first group of indicated DM-RS antenna ports) and applies the strongest layer associated with the other TRP to a second DM-RS antenna port (e.g. the lowest indexed DM-RS antenna port among a second group of indicated DM-RS antenna ports), and associates the first PT-RS antenna port with the first DM-RS antenna port and associates the second PT-RS antenna port with the second DM-RS antenna port.

In the above description, each of N TCI states can be associated with one of N TRPs. Alternatively, each of N TCI states may indicate one DL receive beam for FR2.

In some embodiments, the gNB may be a base unit. In certain embodiments, the steps such as steps 110, 120, 130, 210 and 240 may be performed by a processor executing program code in the base unit, for example, a microcontroller, a microprocessor, a CPU, a GPU, an auxiliary processing unit, a FPGA, or the like.

In some embodiments, the UE may be a remote unit. In certain embodiments, the steps such as steps 140 and 230 may be performed by a processor executing program code in the remote unit, for example, a microcontroller, a microprocessor, a CPU, a GPU, an auxiliary processing unit, a FPGA, or the like.

Figure 3:
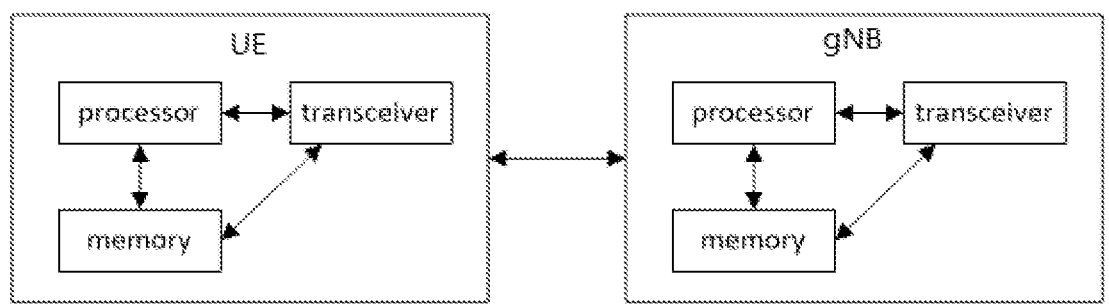
FIG. 3 is a schematic block diagram illustrating apparatuses according to one embodiment.

FIG. 3 is a schematic block diagram illustrating apparatuses according to one embodiment.

Referring to FIG. 3, the UE (i.e. remote unit) includes a processor, a memory, and a transceiver. The processor implements a function, a process, and/or a method. The gNB (i.e. base unit) includes a processor, a memory, and a transceiver. Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
configuring a phase tracking reference signal (PT-RS) with N PT-RS antenna ports when a 'Transmission Configuration Indication (TCI)' field in downlink control information (DCI) indicates N transmission configuration indication (TCI) states, wherein N is 2 or more;
associating each PT-RS antenna port with one demodulation reference signal (DM-RS) antenna port, wherein each PT-RS antenna port is associated with a lowest indexed DM-RS antenna port among the indicated DM-RS antenna ports associated with a different TCI state indicated by the TCI field in the DCI; and
transmitting the PT-RS with the N PT-RS antenna ports.

2. The method of claim 1, further comprising:
configuring a user equipment (UE) to report N layer indicators (LIs); and
receiving the reported N LIs,
wherein each of the N LIs indicates a strongest layer among layers reported by one of N precoding matrix indicators (PMI).

3. The method of claim 2, wherein, each of the strongest layers is assigned to one of the DM-RS antenna ports associated with the PT-RS antenna ports.

4. The method of claim 1, wherein,
N is equal to 2,
a first PT-RS antenna port is associated with the lowest indexed DM-RS antenna port among the indicated DM-RS antenna ports associated with a first TCI state indicated by the TCI field in the DCI, and
a second PT-RS antenna port is associated with the lowest indexed DM-RS antenna port among the indicated DM-RS antenna ports associated with a second TCI state indicated by the TCI field in the DCI.

5. A base unit for wireless communication, comprising:
at least one memory; and
at least one processor coupled with the at least one memory and configured to cause the base unit to:
configure a phase tracking reference signal (PT-RS) with N PT-RS antenna ports when a 'Transmission Configuration Indication (TCI)' field in downlink control information (DCI) indicates N transmission configuration indication (TCI) states, and associates each PT-RS antenna port with one demodulation reference signal (DM-RS) antenna port, wherein N is 2 or more, wherein each PT-RS antenna port is associated with a lowest indexed DM-RS antenna port among the indicated DM-RS antenna ports associated with a different TCI state indicated by the TCI field in the DCI; and transmit the PT-RS with the N PT-RS antenna ports.

6. The base unit of claim 5, wherein the at least one processor is configured to cause the base unit to:

configure a user equipment (UE) to report N layer indicators (LIs); and receive the reported N LIS, wherein each of the N LIs indicates a strongest layer among layers reported by one of N precoding matrix indicators (PMI).

7. The base unit of claim 6, wherein, each of the strongest layers is assigned to one of the DM-RS antenna ports associated with the PT-RS antenna ports.

8. The base unit of claim 6, wherein, two PMIs and single channel quality indicator (CQI) and two LIs are reported, a first LI indicates which column of the precoder matrix of a first reported PMI corresponds to the strongest layer, and a second LI indicates which column of the precoder matrix of a second reported PMI corresponds to the strongest layer.

9. The base unit of claim 6, wherein, two PMIs and two channel quality indicators (CQI) and two LIs are reported, a first LI indicates which column of the precoder matrix of the reported PMI corresponds to the strongest layer corresponding to a larger reported CQI, and a second LI indicates which column of the precoder matrix of the reported PMI corresponds to the strongest layer corresponding to another reported CQI.

10. The base unit of claim 6, wherein, two PMIs and two channel quality indicators (CQI) and two LIs are reported, a first LI indicates which column of the precoder matrix of the first reported PMI corresponds to the strongest layer, and a second LI indicates which column of the precoder matrix of the second reported PMI corresponds to the strongest layer.

11. The base unit of claim 10, wherein, two reported CQIs have equal value.

12. The base unit of claim 5, wherein,

N is equal to 2, a first PT-RS antenna port is associated with a lowest indexed DM-RS antenna port among the indicated DM-RS antenna ports associated with a first TCI state indicated by the TCI field in the DCI, and a second PT-RS antenna port is associated with the lowest indexed DM-RS antenna port among the indicated DM-RS antenna ports associated with a second TCI state indicated by the TCI field in the DCI.

13. The base unit of claim 5, wherein,

N is equal to 2,

DM-RS type 1 or DM-RS type 2 is configured and two CDM groups are indicated by 'antenna port(s)' field in the DCI, a first PT-RS antenna port is associated with a lowest indexed DM-RS antenna port among the indicated DM-RS antenna ports within a first indicated CDM group, and a second PT-RS antenna port is associated with the lowest indexed DM-RS antenna port among the indicated DM-RS antenna ports within a second indicated CDM group.

14. The base unit of claim 5, wherein,

N is equal to 2,

DM-RS type 2 is configured and three code division multiplexing (CDM) groups are indicated by 'antenna port(s)' field in the DCI, a first PT-RS antenna port is associated with a lowest indexed DM-RS antenna port among the indicated DM-RS antenna ports within a first indicated CDM group, and a second PT-RS antenna port is associated with the lowest indexed DM-RS antenna port among the indicated DM-RS antenna ports within two or more other indicated CDM groups.

15. The base unit of claim 5, wherein,

N is equal to 3,

DM-RS type 2 is configured and three code division multiplexing (CDM) groups are indicated by 'antenna port(s)' field in the DCI, a first PT-RS antenna port is associated with a lowest indexed DM-RS antenna port among the indicated DM-RS antenna ports within a first indicated CDM group, a second PT-RS antenna port is associated with the lowest indexed DM-RS antenna port among the indicated DM-RS antenna ports within a second indicated CDM group, and a third PT-RS antenna port is associated with the lowest indexed DM-RS antenna port among the indicated DM-RS antenna ports within a third indicated CDM group.

16. The base unit of claim 5, wherein,

N is equal to 2, two codewords are scheduled by the DCI, a first PT-RS antenna port is associated with a lowest indexed DM-RS antenna port among the indicated DM-RS antenna ports assigned for a first codeword, and a second PT-RS antenna port is associated with the lowest indexed DM-RS antenna port among the indicated DM-RS antenna ports assigned for a second codeword.

17. A remote unit for wireless communications, comprising:

at least one memory; and at least one processor coupled with the at least one memory and configured to cause the remote unit to:

receive a phase tracking reference signal (PT-RS) with N PT-RS antenna ports, wherein N is 2 or more, wherein the N PT-RS antenna ports is configured when a 'Transmission Configuration Indication (TCI)' field in downlink control information (DCI) indicates N transmission configuration indication (TCI) states, and each PT-RS antenna port is associated with a demodulation reference signal (DM-RS) antenna port, and wherein each PT-RS antenna port is associated with a lowest indexed DM-RS antenna port among the indicated DM-RS antenna ports associated with a different TCI state indicated by the TCI field in the DCI.

18. The remote unit of claim 17, wherein the receiver further receives a configuration to report N layer indicators (LIs), and the remote unit further comprising a transmitter that reports N LIs, wherein each of the N LIs indicates a strongest layer among layers reported by one of N precoding matrix indicators (PMI).

19. A processor for wireless communication, comprising:
at least one controller coupled with at least one memory and configured to cause the processor to:
receive a phase tracking reference signal (PT-RS) with N PT-RS antenna ports, wherein N is 2 or more,
wherein the N PT-RS antenna ports is configured when a 'Transmission Configuration Indication (TCI)' field in downlink control information (DCI) indicates N transmission configuration indication (TCI) states, and
each PT-RS antenna port is associated with a demodulation reference signal (DM-RS) antenna port, and wherein each PT-RS antenna port is associated with a lowest indexed DM-RS antenna port among the indicated DM-RS antenna ports associated with a different TCI state indicated by the TCI field in the DCI.

20. The processor of claim 19, wherein the at least one controller is configured to cause the processor to receive a configuration to report N layer indicators (LIs), and report N LIs, wherein each of the N LIs indicates a strongest layer among layers reported by one of N precoding matrix indicators (PMI).

* * * * *